May 21, 1935.   F. H. SENSIBA ET AL   2,002,251
DEFECTIVE LIGHT SIGNAL
Original Filed Dec. 17, 1931
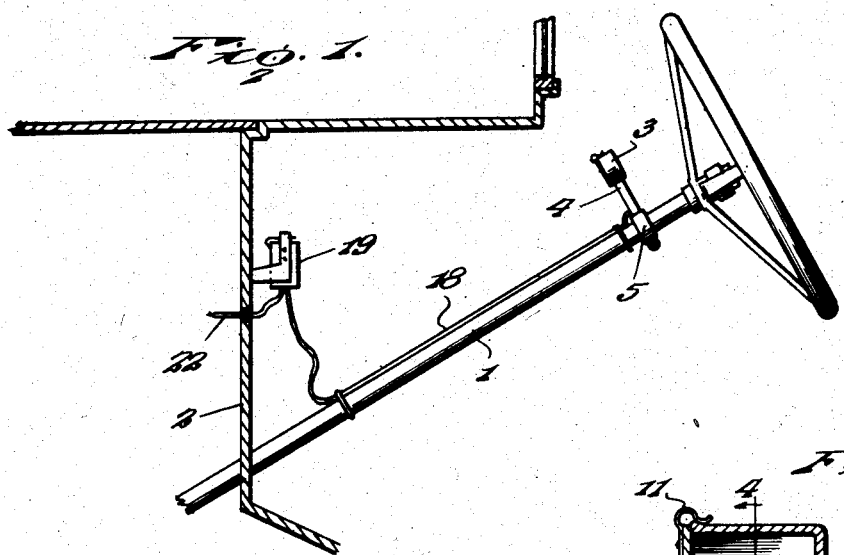
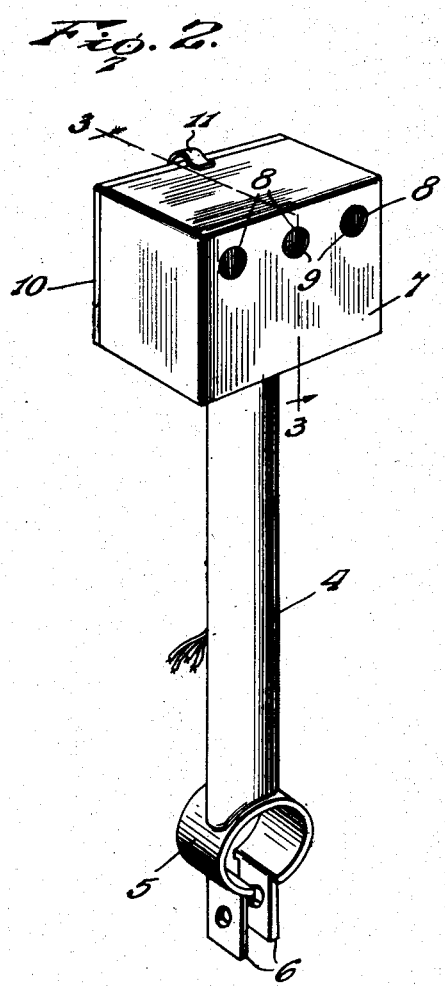
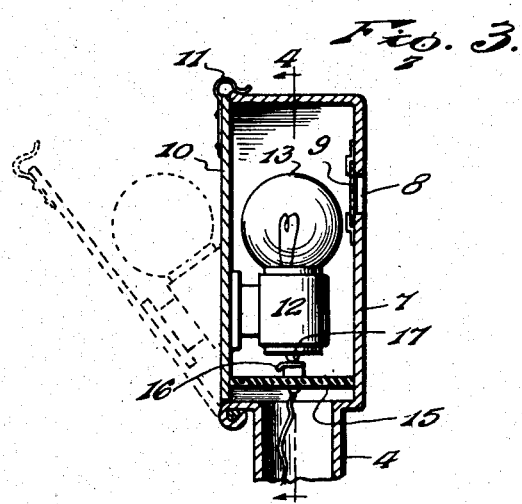
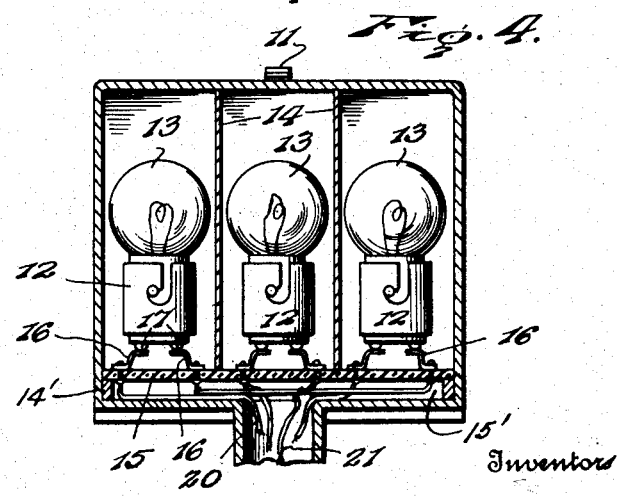
Inventors
F. H. Sensiba.
C. W. Sensiba.
By Lacey & Lacey, Attorneys Patented May 21, 1935

2,002,251

UNITED STATES PATENT OFFICE 2,002,251

DEFECTIVE LIGHT SIGNAL

Frederick Harrison Sensiba and Claude Warner Sensiba, Crystal Falls, Mich., assignors of one-third to John B. O'Hora, Green Bay, Wis.

Original application December 17, 1931, Serial No. 581,759. Divided and this application September 8, 1932, Serial No. 632,258

2 Claims. (Cl. 177—329)

This invention is a division of our co-pending application for patent on Defective-light signal, filed December 17, 1931, Serial Number 581,759.

The invention provides a signal light for automobiles, airplanes, motor boats, and other automotive vehicles, adapted to be located on the steering wheel and to be operatively connected to the bright lights of the headlights, the dim lights of the headlights, and the tail light of the vehicle in such a manner that should any one of the lights fail to operate the corresponding signal light will be energized and disclose such inoperativeness to the driver.

A further object is to provide a signal box having a plurality of cells for the signal lights, and having a hinged cover which carries the signal lights as a unit therewith, there being electrical contacts within the box and so located that when the cover is swung to closed position they will engage the terminals of respective lamps.

With the above and other objects in view the invention consists in certain novel details of construction and combinations of parts hereinafter fully described and claimed, it being understood that various modifications may be resorted to within the scope of the appended claims without departing from the spirit or sacrificing any of the advantages of the invention.

In the accompanying drawing forming part of this specification,

Figure 1 is a view partly in section and partly in side elevation of a steering column of an automobile showing the signal box applied thereto, Figure 2 is a perspective view of the signal box, Figure 3 is a cross section taken on the line 3—3 of Figure 2, and Figure 4 is a section taken on the line 4—4 of Figure 3.

Referring now to the drawing in which like characters of reference designate similar parts in the various views, the reference numeral 1 indicates the steering column of an automobile and 2 the dashboard of the same which may be of any well known or approved form. In carrying out the invention there is provided a signal box 3 which is mounted upon the steering column close to the steering wheel, as shown in Figure 1, the box being provided with a hollow post 4 extending downwardly therefrom and formed at its lower end with a clamping band 5 encircling the column and provided with mating lugs 6 through which a clamping bolt may be inserted below the column so that the band will be secured tightly about the column and the box supported thereby.

The box consists of a rear wall 7 which is arranged to face the chauffeur and is provided with a plurality of sight openings 8 each of which is covered by a pane 9 of red glass or other light-transmitting material. A front plate 10 is hinged, at its lower edge, to the bottom of the box 3 and is adapted to be swung up against the open front side of the box and be held thereto by a spring latch 11, as will be understood by referring to Figure 3. This cover or front plate 10 is provided, on its inner side, with a plurality of supports 12 each of which is adapted to receive and hold an incandescent lamp 13.

In the drawing, three signal lamps 13 have been illustrated, and a partition 14 of some opaque material is provided within the box, between each two lamps, so that the box is divided into cells each containing one lamp and the light from each lamp will be prevented from interfering with the light from any other lamp.

There is also a base plate 15 within the box, of insulating material, said plate being spaced from the bottom of the box by end cleats 14' to form an intermediate chamber 15', and upon this base plate are mounted resilient terminals 16 which are adapted to make contact with the terminals 17 upon the respective lamps when the cover or front plate 10, carrying the lamps, is swung up to closed position, as shown in Figures 3 and 4. The lamps correspond in number to the head lights and tail light of the vehicle and each signal light is adapted to be connected in circuit with one of the head lights or the tail light, as specifically disclosed in the heretofore mentioned co-pending application.

Conductors from the terminals 16 are disposed within the chamber 15' and extend down through the hollow post 4, as will be understood upon reference to Figure 4, and are then carried in a cable 18 along the steering column to the magnet box 19 which, as disclosed in said co-pending application, is operatively connected in circuit with the bright and dim lights of the head lights and the tail light to close a circuit through one of the signal lamps 13 when a head light or tail light becomes inoperative, and energize the corresponding signal light 13. It will be noted, upon reference to Figure 4, that current is brought to the several lamps 13 over separate conductors 20 while a common return 21 is connected with the opposite terminals of all of the lamps. The magnet box 19 is preferably mounted upon the dashboard 2 of the vehicle and a cable 22 is carried from the magnet box through the dashboard to be connected to the several signal lamps 13.

From the above description it is thought that the construction and operation of our improved signal box will be thoroughly understood without further explanation.

What is claimed is:

1. A signal apparatus comprising a signal box having a plurality of cells and provided with a sight opening in one side of each cell, a swinging back plate hinge at the lower edge to the box, a latch carried by the top of the plate and engageable over the top of the box to hold the back plate closed, fixed lamp supports carried by the inner face of said back plate and movable as a unit therewith when the back plate is opened or closed, lamps mounted in the several supports with their longitudinal axes in a plane parallel to the plane of the hinged back plate and movable therewith, end cleats secured to the bottom of the box, an insulated plate resting on said end cleats and spaced from the bottom of the box to form an intermediate chamber, resilient contacts, means for mounting the contacts on said insulated plate in position to engage the terminals of the lamps when the back plate is swung to closed position, and electric conductors extending through an opening in the bottom of the box and within said chamber for engagement with said contacts.

2. A signal box having a plurality of cells and provided with a sight opening in the side of each cell, a swinging cover hinged to the box, lamp supports carried by the inner face of said cover, lamps mounted in the several supports with their longitudinal axes in a plane parallel to the plane of the cover and movable therewith, end cleats disposed within the box, an insulated plate resting on said cleats and spaced from the bottom of the box to form an intermediate chamber, contacts on said insulated plate, means for mounting the contacts in position on the plate to engage the terminals of the lamps when the cover is swung to closed position, and electric conductors disposed within the chamber and operatively connected with said contacts.

FREDERICK HARRISON SENSIBA. [L. S.]
CLAUDE WARNER SENSIBA. [L. S.]